United States Patent
Abdouch et al.

(10) Patent No.: US 12,473,073 B2
(45) Date of Patent: Nov. 18, 2025

(54) WINGTIP ATTACHMENT WITH A REDUCTION IN IN-TANK WORK AND AERODYNAMIC DRAG

(71) Applicant: The Boeing Company, Arlington, VA (US)

(72) Inventors: Mark M. Abdouch, Mukilteo, WA (US); Christopher R. Loesche, Bothell, WA (US); Erik A. Phillips, Kirkland, WA (US); Tyler W. Downey, Bellevue, WA (US); Jeffrey S. Moffett, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/391,027

(22) Filed: Dec. 20, 2023

(65) Prior Publication Data
US 2025/0206435 A1     Jun. 26, 2025

(51) Int. Cl.
*B64C 3/18* (2006.01)
*B64C 1/26* (2006.01)
*B64C 3/28* (2006.01)

(52) U.S. Cl.
CPC .............. *B64C 3/187* (2013.01); *B64C 1/26* (2013.01); *B64C 3/28* (2013.01)

(58) Field of Classification Search
CPC ....... B64C 23/00; B64C 23/06; B64C 23/065; B64C 23/069
USPC ..................................................... 244/199.4
See application file for complete search history.

(56) References Cited

U.S. PATENT DOCUMENTS

| | | | |
|---|---|---|---|
| 3,273,833 A * | 9/1966 | Windecker | B64C 3/26 416/223 R |
| 8,844,869 B2 * | 9/2014 | Andre | B64C 1/26 244/119 |
| 9,248,900 B2 * | 2/2016 | Jareño Diz Lois | B64D 45/02 |
| 9,422,049 B2 * | 8/2016 | Whitlock | B64C 23/069 |
| 9,517,832 B2 * | 12/2016 | Davies | B64C 23/069 |
| 10,272,990 B2 * | 4/2019 | Lian | B64C 23/069 |
| 2007/0018049 A1 * | 1/2007 | Stuhr | B64C 23/069 244/124 |
| 2012/0112005 A1 * | 5/2012 | Chaussee | B64C 23/072 244/123.1 |
| 2015/0203190 A1 * | 7/2015 | Witte | B64C 23/069 244/199.4 |
| 2016/0144951 A1 * | 5/2016 | Zaman | B64C 23/065 244/199.4 |
| 2016/0176499 A1 | 6/2016 | Evans | |
| 2018/0237127 A1 | 8/2018 | Hewson et al. | |
| 2020/0283131 A1 | 9/2020 | Witte et al. | |

(Continued)

OTHER PUBLICATIONS

Extended European Search Report (EESR) issued Apr. 14, 2025 in corresponding EP Application No. 24222255.2, 8 pages.

*Primary Examiner* — Michael H Wang
*Assistant Examiner* — Ryan Andrew Yankey
(74) *Attorney, Agent, or Firm* — MH2 Technology Law Group LLP (57) ABSTRACT

A wingtip attachment for connection to a wing is disclosed. The wingtip attachment includes a tip rib comprising a first row of fastener openings located within an aerodynamic contour of a wing box and a second row of fastener openings located within a protruding fairing outside the nominal aerodynamic contour of a wing box.

20 Claims, 12 Drawing Sheets

(56) References Cited

U.S. PATENT DOCUMENTS

| | | | |
|---|---|---|---|
| 2020/0385146 A1* | 12/2020 | Pursey | B64F 5/10 |
| 2022/0135212 A1* | 5/2022 | Steadman | B64C 3/185 |
| | | | 244/199.4 |

* cited by examiner

WINGTIP ATTACHMENT WITH A REDUCTION IN IN-TANK WORK AND AERODYNAMIC DRAG

FIELD OF THE DISCLOSURE

The present disclosure relates to wingtip attachments, and in particular to wingtip attachments with a reduction in in-tank work and improved airplane performance.

BACKGROUND

An aircraft wing generally includes several components that provide internal support or aerodynamic surfaces for the wing. For example, the wing can include ribs, stringers, spars, and skins, among other components. Ribs are generally interior structures that extend from a leading edge of the wing to the trailing edge of the wing. Ribs are typically spaced along the outboard/inboard directions of the wing. Spars and stringers generally extend from the fuselage to a tip of the wing in the outboard/inboard direction. Spars and stringers are generally attached to the ribs where the spars or stringers intersect the ribs. Stringers are generally bonded or fastened to an interior surface of a skin that forms an exterior (e.g., aerodynamic) surface of the wing.

Existing solutions for attaching a wingtip take several forms. Some designs rely on a joint which is fully contained within the aerodynamic contour of the wing utilizing tension bolts which are accessed through a hole or removable portion of the lower panel. Other existing designs utilize lug and clevis joints with a series of pins which may be heavier or less damage tolerant in the case of failures resulting in parts departing the airplane in service. Still others have used a pin (piano hinge joint) running along the airstream paired with an in-tank tension joint which may result in a thicker airfoil in this region. Some existing solutions, typically utilized for wing-body or mid-wing arrangements as opposed to wingtips, using a tension joint with pins able to be accessed from the outside on both the upper and lower panel, but this requires that mechanics access both the top and bottom side of the wing to access all pins.

Therefore, a need exists for wingtip attachments with a reduction in in-tank work and improved airplane performance and method for installing such wingtip attachments are needed.

SUMMARY

According to examples of the present disclosure, a wingtip attachment for connection to a wing is disclosed. The wingtip attachment comprises a tip rib comprising a first row of fastener openings located within an aerodynamic contour of a wing box and a second row of fastener openings located outside the aerodynamic contour of a wing box.

Various additional features can be included in the wingtip attachment including one or more of the following features. The wingtip attachment further comprises a panel door arranged on an underside surface of the wing that provides access to the first row of fastener openings. The wingtip attachment further comprises a removable section of an underside surface or a topside surface of the wing that provides access to the first row of fastener openings. The wingtip attachment further comprises an aerodynamic fairing covering the panel door and configured to provide an aerodynamically continuous surface between a portion of a leading edge and a portion trailing edge of the wing. The wingtip attachment further comprises an aerodynamic fairing covering the removable section and configured to provide an aerodynamically continuous surface between a leading edge and a trailing edge of the wing. The second row of fastener openings are accessible outside of the wing box. The second row of fastener openings are covered by an aerodynamic fairing that provides an aerodynamically continuous surface between a leading edge and a trailing edge of the wing. The wingtip attachment further comprises a first row of fasteners for engagement with the first row of fastener openings and a second row of fasteners for engagement with the second row of fastener openings. Each fastener of the first row of fasteners comprises a tension bolt threadedly engaged with a barrel nut. Each fastener of the second row of fasteners comprises a tension bolt threadedly engaged with a nut.

According to examples of the present disclosure, a method of servicing a wingtip of a wing is disclosed. The method comprises accessing a first row of fasteners that are engaged with a first row of tension bolt fastener openings in a tip rib located in a wing box and within an aerodynamic contour of the wing; removing an aerodynamic fairing covering a panel door or a removable section arranged on an underside segment of the wing; and accessing a second row of fasteners that are engaged with a second row of tension bolt fastener openings in the tip rib located outside the wing box and outside the aerodynamic contour of the wing.

Various additional features can be included in the method of servicing the wingtip of the wing including one or more of the following features. The aerodynamic fairing provides an aerodynamically continuous surface between a leading edge and a trailing edge of the wing. Each fastener of the first row of fasteners comprises a tension bolt threadedly engaged with a barrel nut. Each fastener of the second row of fasteners comprises a tension bolt threadedly engaged with a nut.

According to examples of the present disclosure, a method of removing a first wingtip of a wing is disclosed. The method comprises removing an aerodynamic fairing that provides an aerodynamically continuous surface between a portion of a leading edge of the wing and a portion of a trailing edge of the wing; removing a first row of fasteners that are engaged with a first row of bolt fastener openings in a tip rib located in a wing box and within an aerodynamic contour of the wing; removing a second row of fasteners that are engaged with a second row of bolt fastener openings in the tip rib located outside the wing box and outside the aerodynamic contour of the wing; and detaching the first wingtip from the wing.

Various additional features can be included in the method of removing the first wingtip of the wing including one or more of the following features. The aerodynamic fairing covers a panel door or a removable section arranged on an underside segment or an upperside segment of the wing. Each fastener of the first row of fasteners comprises a tension bolt threadedly engaged with a barrel nut. Each fastener of the second row of fasteners comprises a tension bolt threadedly engaged with a nut. The method further comprises attaching a second wingtip to the wing after detaching the first wingtip. The method further comprises reengaging each fastener of the first row of fasteners and reengaging each fastener of the second row of fasteners.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Generally speaking, the wingtip attachment, as described in the disclosed examples, provides a solution to make a wingtip which is able to be installed and removed while still allowing a thinner overall wing that provides a wing with reduced airfoil thickness, improving airplane and/or aerodynamic performance by increasing lift/drag. This provides a solution to the common challenge of creating a design which is easy to maintain or service, in this case providing replaceability of a wingtip in service, while minimizing impacts to airplane performance, primarily weight and drag.

Examples of the present disclosure provides for a series of fasteners, such as tension bolts, with the upper row located within the aerodynamic contour, accessed through a provision in the wing box, such as for example a lower panel door, a removable portion of the upper panel, holes in the spars, or other removable section(s), and another row of fasteners, such as bolts or tension bolts, which may be positioned below the adjacent lower aerodynamic surface, are accessed from the outside, and covered by an aerodynamic fairing which may protrude below the lower surface. In some examples, a leading edge rib and/or a trailing edge rib may support the one or more aerodynamic fairings to provide an aerodynamically continuous surface between the leading edges and the trailing edges of the wing. This may allow for the wing to be made thinner with a local aerodynamic fairing which in some cases may reduce overall drag when compared to making the wing thicker to enable one of the prior solutions. In this arrangement, the fasteners for disassembly can all be accessed from the lower surface of the wing which can avoid risks associated with gaining access to the top of the wing such as fall hazards. Examples of the present disclosure provides for overall loft thickness, bolt spacing as needed, joint protrusion into airstream, fairing thickness, and integration clearances. In some examples, the fairing width can change depending on the orientation of the tip rib architecture. For example, if the tip rib is streamwise, then the fairing can be smaller in width then a tip rib that is not streamwise due to the fairing being streamwise.

For example, the wingtip attachment combines both in tank tension fasteners attachment and out of tank fasteners, such as bolts or tension bolts, which can be used to meet a unique set of requirements where the wing tip attachment is driving wing loft such that using the disclosed arrangement can enable a thinner overall wing with an aerodynamic fairing to cover the external parts of the joint resulting in an overall airplane performance benefit. The technical features include the use of two rows of tension fasteners, such as bolts or tension bolts, to attach the wing to wingtip, where one row is arranged inside the wing such that access is provided through either a hole in the lower panel or removable portion of the lower panel or upper panel and one row is arranged outside the wing such that access is provided without having to enter the wing, some of these fasteners may be within or outside the aerodynamic loft contour depending on the chordwise position and aerodynamic loft. This allows for the wingtip to be replaced in service within a limited time frame which is commonly valuable to customers following damage in this region. In some examples, two mechanics can work at the same time, one on the interior while the other on the exterior to service the wingtip. In one example, one or more discrete aerodynamic fairings may be attached to the wing using small mechanical fasteners extending through the aerodynamic fairing and engaging small barrel nuts, nutplates, threaded bore, or other threaded receptacles.

Figure 1:
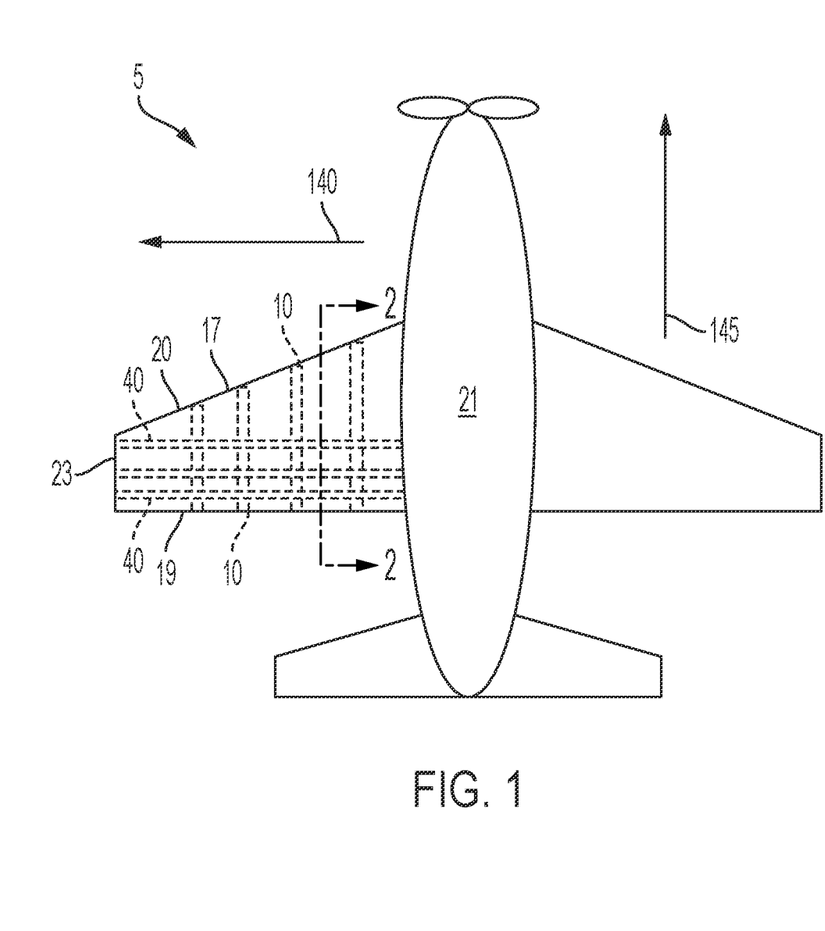
FIG. 1 is a schematic diagram of an aircraft including an aircraft wing.

FIG. 1 is a schematic diagram of an aircraft 5 including an aircraft wing 20. The aircraft wing 20 includes several ribs 10 and several stringers 40 that form an internal structure or framework of the aircraft wing 20. The ribs 10 are dispersed along an outboard direction 140 of the aircraft 5 and extend substantially from a leading edge 17 of the aircraft wing 20 to a trailing edge 19 of the aircraft wing 20. The stringers 40 are dispersed along a forward direction 145 of the aircraft 5 and extend substantially from a fuselage 21 of the aircraft 5 to an outboard tip 23 of the aircraft wing 20. The stringers 40 are generally attached (e.g., via apparatus 100) to the ribs 10 where the stringers 40 and the ribs 10 intersect, forming substantially perpendicular angles.

Figure 2:
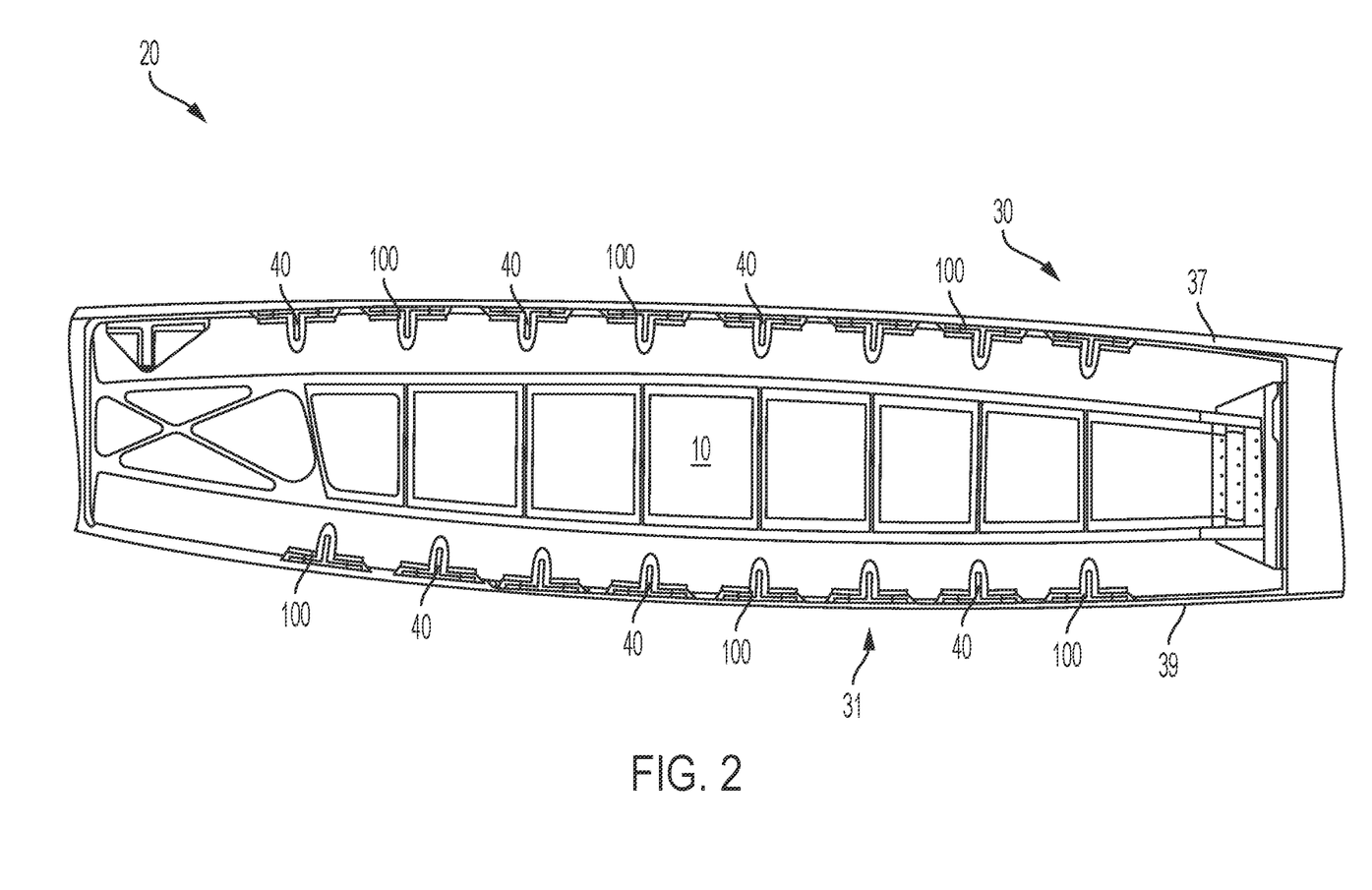
FIG. 2 is an inboard looking cross section of the aircraft wing.

FIG. 2 is an inboard looking cross section of the aircraft wing 20. The aircraft wing 20 includes a panel 30 (e.g., an upper panel) that includes a skin 37 (e.g., an upper skin) and stringers 40 that are bonded, fastened, or welded (i.e., welded via a thermoplastic weld) or otherwise attached to an interior surface the skin 37. The aircraft wing 20 also includes a panel 31 (e.g., a lower panel) that includes a skin 39 (e.g., a lower skin) and stringers 40 that are bonded, fastened, or welded (i.e., welded via a thermoplastic weld) or otherwise attached to an interior surface of the skin 39. The aircraft wing 20 also includes several apparatus 100 that attach the rib 10 to the panel 30 or the panel 31.

The rib 10, the panel 30 (e.g., the skin 37 and the stringers 40 that are attached to the skin 37), and the panel 31 (e.g., the skin 39 and the stringers 40 that are attached to the skin 39) are typically formed of metal or composite materials such as fiberglass, carbon fibers, or polymers.

Figures 3A, 3B:
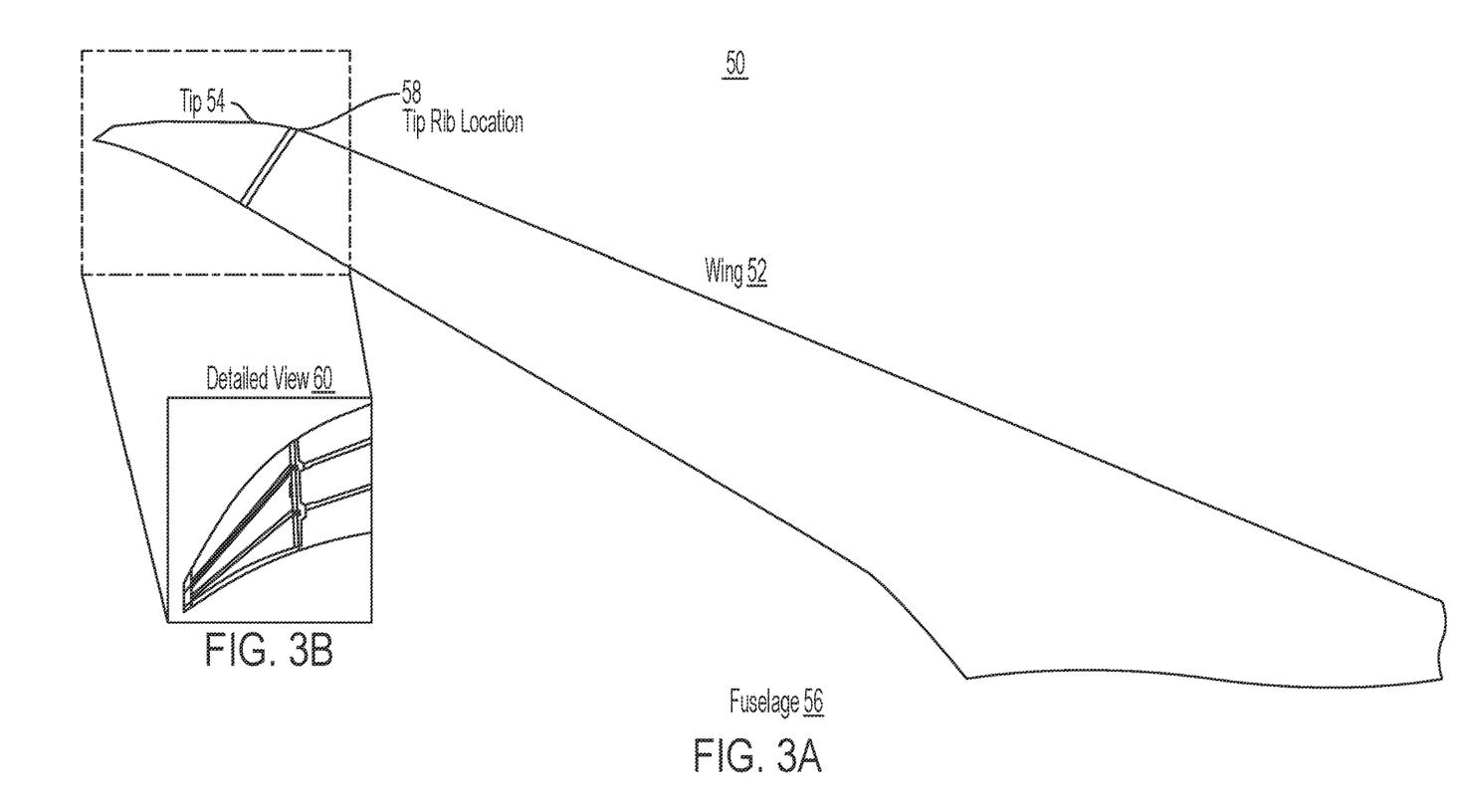
FIG. 3A shows top perspective view of a tension joint with external aerodynamic fairing according to examples of the present disclosure.
FIG. 3B shows a view of FIG. 3A looking inbound to the wingtip.

FIG. 3A shows wing structure 50 showing a tip rib location according to examples of the present disclosure. FIG. 3B shows a closeup of FIG. 3A at the wingtip. Wing structure 50 comprises wing 52 extending from one side of fuselage 56 of a plane. At the end of the wing away from fuselage 56 is the location of tip end rib 58. Tip rib 58 forms a junction between wing 52 and wingtip or tip 54.

Figure 4A:
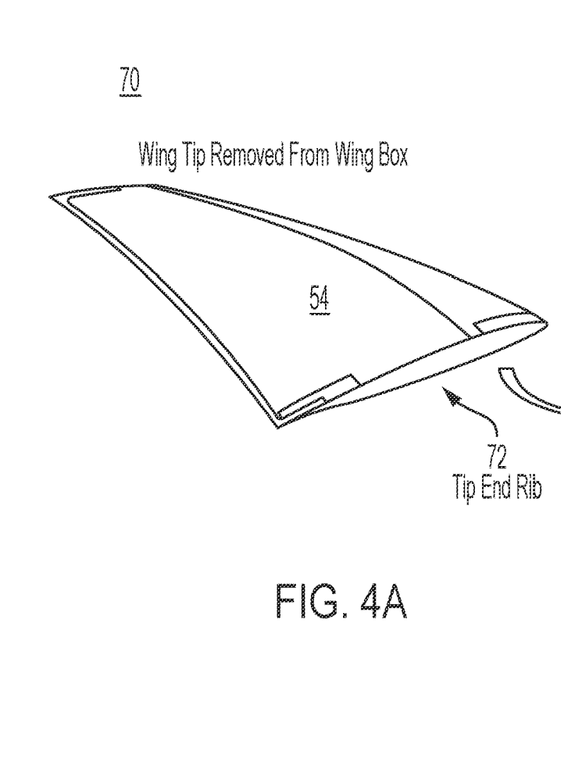
FIG. 4A, FIG. 4B, and FIG. 4C show views of FIG. 3A looking outbound to the wingtip with example tip rib aerodynamic fairing height dimensions.
Figure 4B:
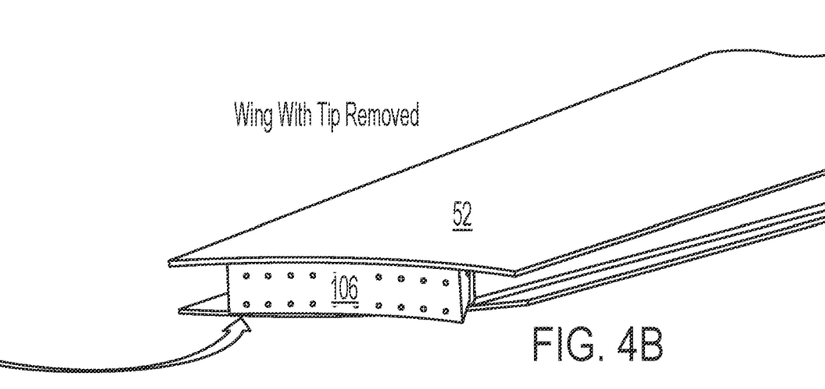
Figure 4C:
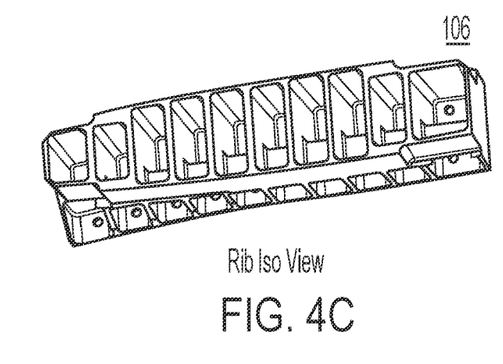

FIG. 4A shows a view 70 of the wing tip that is removed from the wing box according to examples of the present disclosure. FIG. 4B shows wing 52 with the wing tip 54 of FIG. 4A detached, without showing any of the leading and trailing edges structure for clarity. FIG. 4C shows an iso view of tip rib 106 that forms the junction between wing 52 and wing tip 54. Tip end rib 72 is located at inward surface of wing tip 54.

Figure 5A:
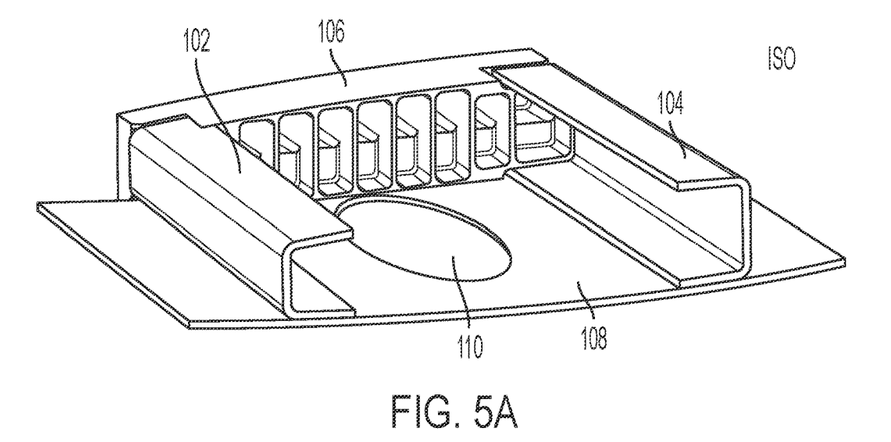
FIG. 5A, FIG. 5B, FIG. 5C show views of FIG. 3A looking upward from the bottom of the wingtip with example tip rib aerodynamic fairing width dimensions.
Figure 5B:
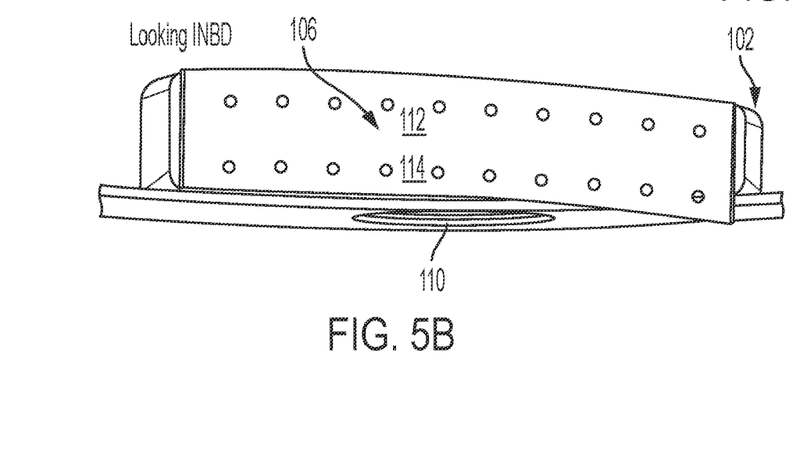
Figure 5C:
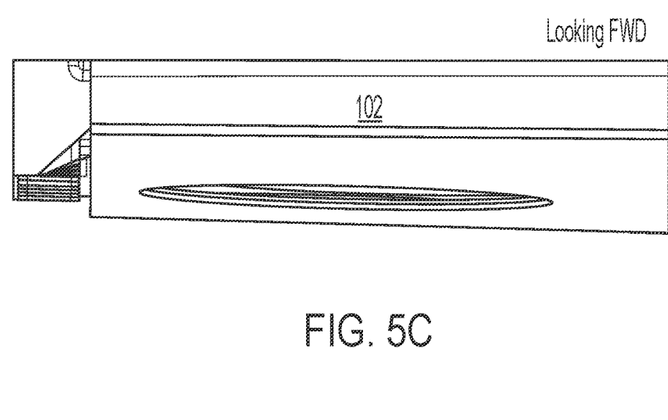

FIG. 5A shows top perspective view of a tension joint with external aerodynamic fairing according to examples of the present disclosure. FIG. 5B shows a view of FIG. 5A looking inbound towards the wing box and then the airplane fuselage. FIG. 5C shows a view of FIG. 5A looking forward of the wingtip. The external aerodynamic fairing is used to cover the joint depth needed to enable integration of the joint. The driving parameters include gage, bolt spacing, bolt diameter, and fastener installation. As shown in the section of the wing as shown in FIG. 5A, a first spar 102, i.e., a rear spar, and a second spar 104, i.e., forward spar, is shown attached at one end to a rib 106 and the upper wing skin is not shown for clarity. First spar 102 and second spar 104 run spanwise at right angles to the fuselage and the spars and generally have a U-shape with the open portions of the U-shapes facing each other. Rib 106 comprises receiving portions on both ends of rib 106 that shaped to receive and secure the U-shape end of first spar 102 and second spar 104. Skin 108 encloses first spar 102 and second spar 104. Skin 108 comprises an access hole 110 that can be covered by a removable access or panel door or structure and that is arranged between first spar 102 and second spar 104 and allows access to rib 106, such that fasteners can be inspected, removed, and/or replaced. As shown in FIG. 5B, rib 106 comprises a first row of fastener openings 112 and a second row of fastener openings 114. Access hole 110 allow access to rib 106 for maintenance and inspection.

Figures 6A, 6B:
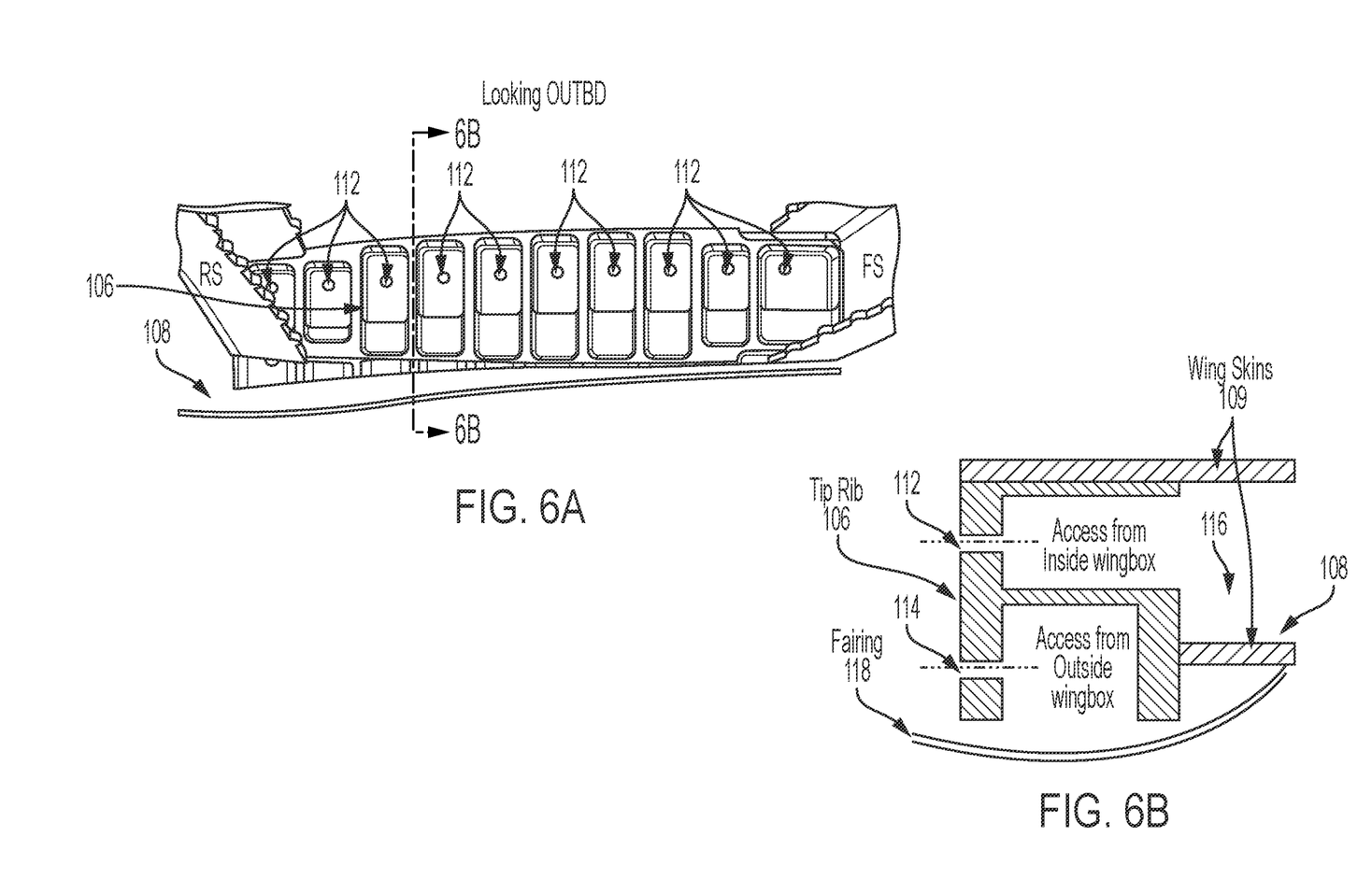
FIG. 6A and FIG. 6B show top perspective view of a wingtip with external aerodynamic fairing according to examples of the present disclosure.

FIG. 6A shows a view of FIG. 5A looking outbound to the wingtip with example tip rib aerodynamic fairing height dimensions. As shown in FIG. 6A, tip rib 106 comprises a first row of fastener apertures 112 that are accessible through the body of wing box 116 which is bound on either side by upper wing skin 109 and lower wing skin 108. Tip rib 106 also comprises a second row of fastener apertures 114 that are accessible from the outside of the body of wing box 116 which is bound on either side by lower wing skin 108 and aerodynamic fairing 118. Generally speaking, the height at the rear spar plane can range from under an inch to several inches, which includes thickness requirements for any fairing structure and appropriate integration clearances. By one non-limiting example, the height (streamwise joint) at rear spar plane can be about 1.00 inch±0.50 inch, the loft protrusion can be about plus 0.30 inch±0.10 inch, the fairing thickness and clearance can be about 1.50 inch±0.50 inch. FIG. 6B shows a cross section of FIG. 6A along the A-A direction looking outbound from the airplane body, as shown in FIG. 6A and FIG. 6B.

Figure 7:
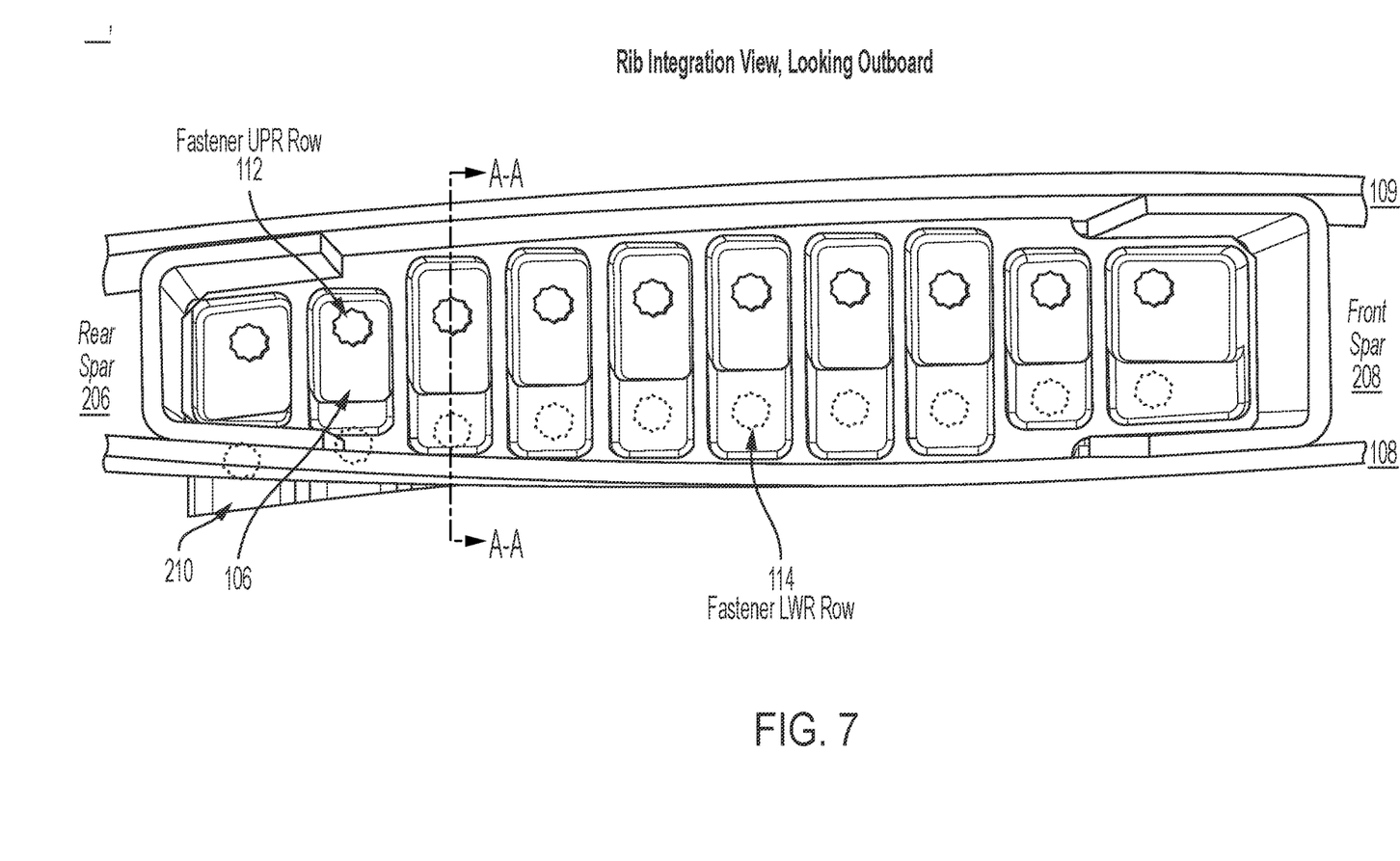
FIG. 7 shows a rib integration view looking outboard to the wingtip according to examples of the present disclosure.

FIG. 7 shows a rib integration view looking outboard to the wingtip according to examples of the present disclosure. Tip rib 106 is shown bounded by top wing skin 109 and bottom wing skin 108 on the top and bottom of tip rib 106, respectively, and connected with rear spar 206 and front spar 208 at an inboard surface at a front end and rear end of tip rib 106, respectively. In some examples, a portion 210 of tip rib 106 may extends below the bottom wing skin 108 and may be covered by an aerodynamic fairing, as shown further herein, such as aerodynamic fairing 118. Tip rib 106 comprises a first row of fastener apertures 112 that are accessible through the body of wing box 116 which is bound on either side by upper wing skin 109 and lower wing skin 108. Tip rib 106 also comprises a second row of fastener apertures 114 that are accessible from the outside of the body of wing box 116 which is bound on either side by lower wing skin 108 and aerodynamic fairing 118.

Figure 8:
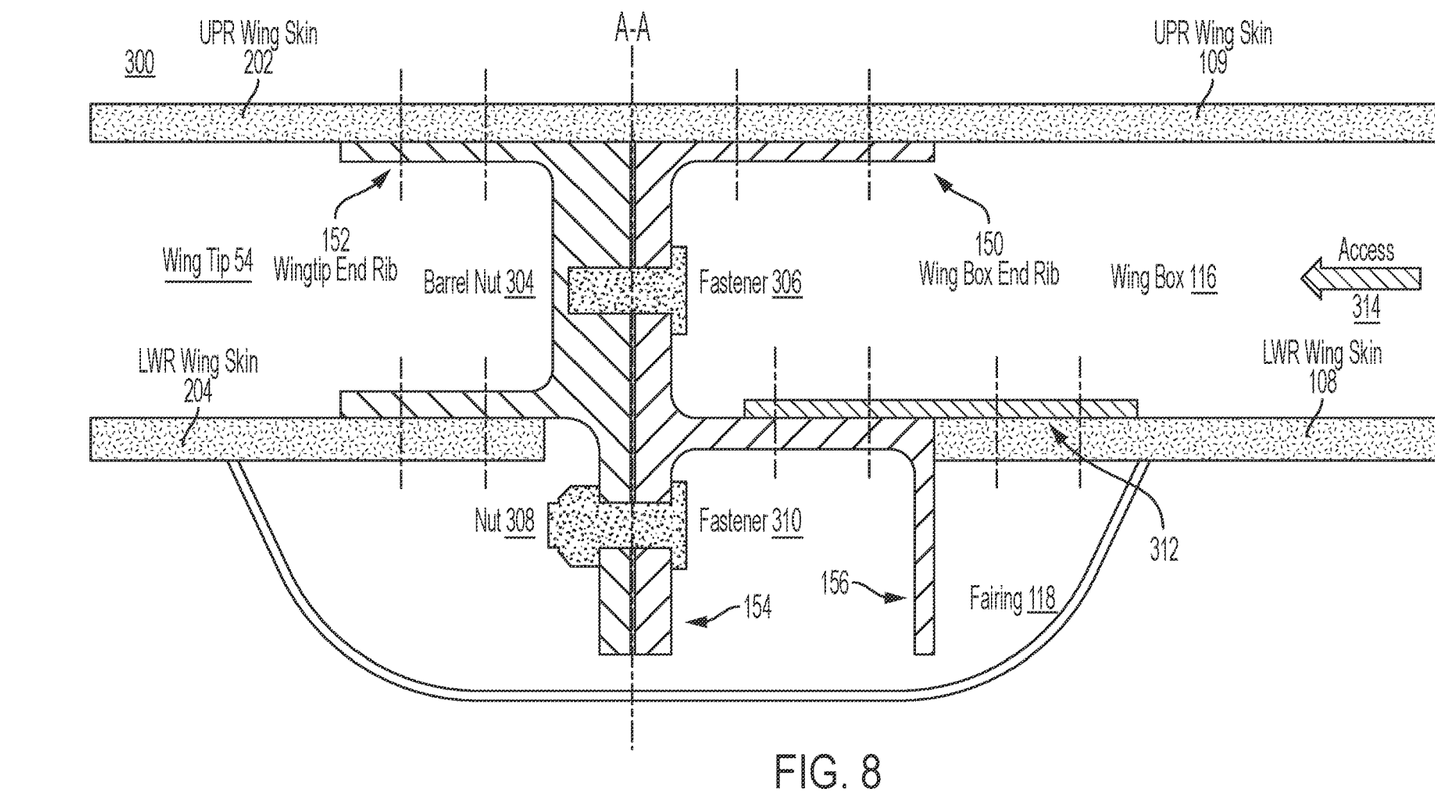
FIG. 8 shows a cross section of FIG. 7 along the A-A direction looking outbound from the airplane body.

FIG. 8 shows a cross section of FIG. 7 along the A-A direction looking outbound from the airplane body. Wing box end rib 150 of tip Rib 106 portion of wing box 116 and wingtip tip rib 152 of tip rib 106 portion of wing tip 54 is shown bound on a top surface by upper wing skin 109 and on a lower surface by lower wing skin 108. Fastener 306 and nut 304, such as a barrel nut, secures tip rib 106 portion of wing box 116 and tip rib 106 portion of wing tip 54 together through one of first row of fastener apertures 112 in wing box 116. Fastener 306 is accessible to be maintained or removed through the wing box 116, as indicated by access arrow 314. Fastener 310 and nut 308, which can include use of a barrel nut, secures tip rib 106 portion of wing box 116 and tip rib 106 portion of wing tip 54 together through one of second row of fastener apertures 114 below lower wing skin 108 this is removably covered by aerodynamic fairing 118. Access hole 110 is formed by a gap in lower wing skin 108 that allows a lower end of tip rib 106 to extend through. As shown, tip rib 106 is generally configured as a capital "H"-like shape in profile, with an extended first tip rib lower protrusion 154 extending in the same direction as the crossbar in the "H"-like shape and an extended second tip rib lower protrusion 156 extending in in the same directed and at about the same location as the crossbar in the "H"-like shape. First tip rib lower protrusion 154 and second tip rib lower protrusion of tip rib 106 are shown extending below lower wing skin 108 and covered by aerodynamic fairing 118. Within the internal structure of wing box 116, structural joint 312 is used if integration requires the rib height to match the wing box height that bridges at least a portion of the gap in lower wing skin 108 to reduce the gap defined by access hole 110. Structural joint 312 can be secured to an internal surface of lower wing skin 108 by appropriate airplane bonding techniques.

Figure 9:
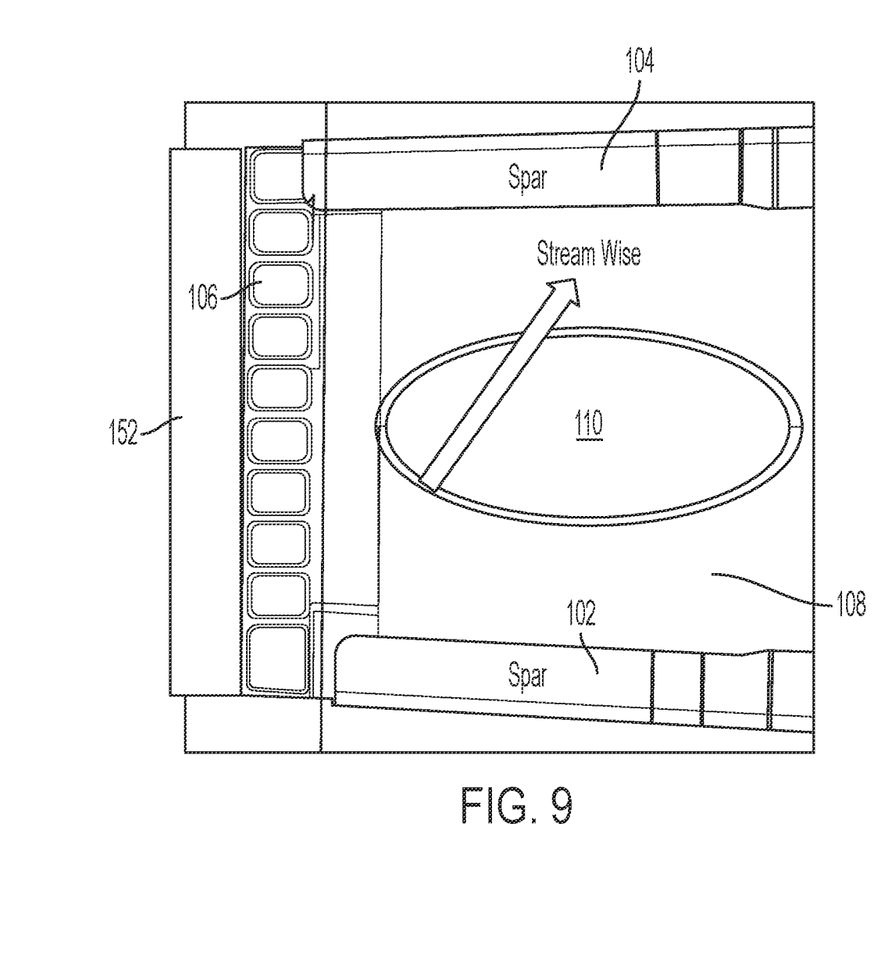
FIG. 9 shows a view of FIG. 5A looking upward from the bottom of the wingtip with illustrating access hole that may be uncovered by removing aerodynamic fairing to provide access to the wing interior according to examples of the present disclosure.

FIG. 9 shows a view of FIG. 5A looking upward from the bottom of the wingtip with illustrating access hole 110 that may be uncovered by removing aerodynamic fairing 118 to provide access to the wing interior according to examples of the present disclosure. Access hole 110 may preferably be large enough to allow for insertion of hand tools for installation and removal of the tension fasteners. Access hole 110 facilitates one-sided-access to the wing interior for installing the tension fasteners securing the wingtip to the wing. The tension fasteners may be threadedly engaged to barrel nuts. Nuts, such as barrel nuts, are located in the rib attached to the wing tip structure. The rib on the wing side has through holes for the fasteners. In this manner, access hole 110 that may be uncovered by removing aerodynamic fairing 118 as disclosed herein provide a means for relatively rapid installation, removal, and replacement of the wingtip.

Figure 10A:
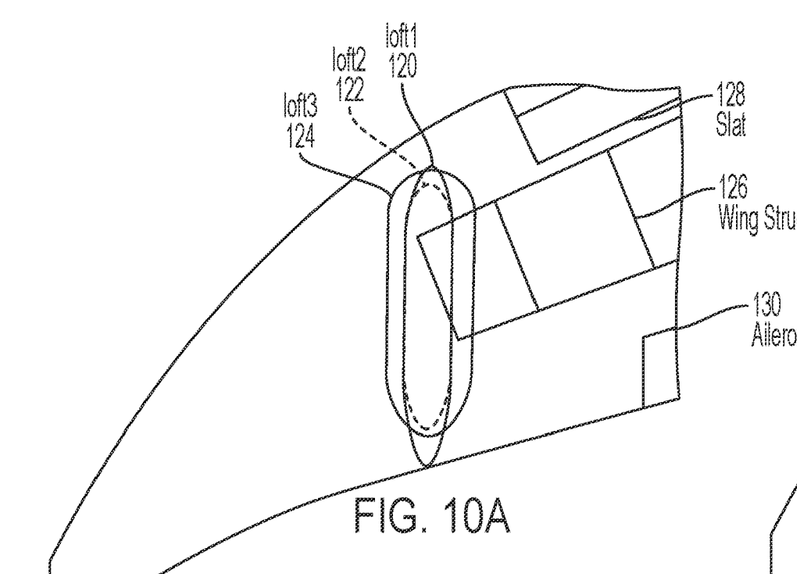
FIG. 10A and FIG. 10B show top perspective views of a wingtip with external aerodynamic fairing according to examples of the present disclosure.
Figure 10B:
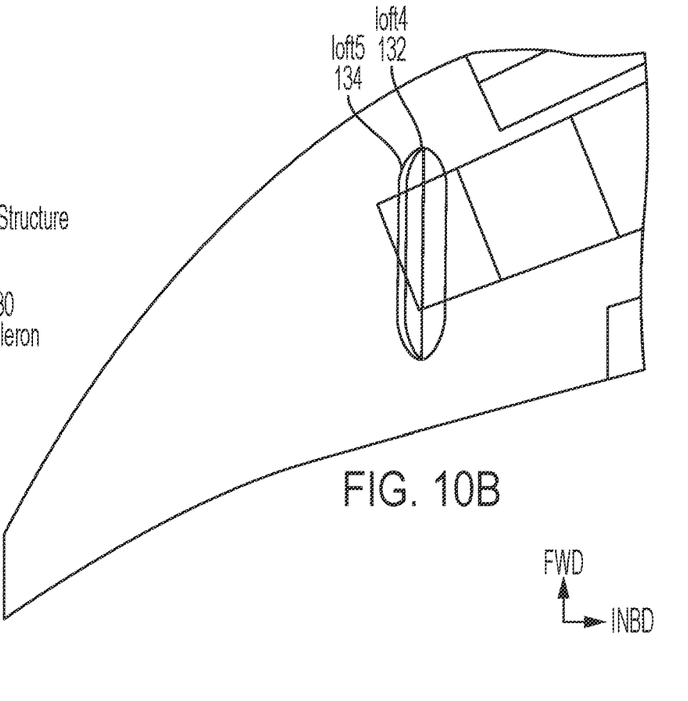
Figure 10C:
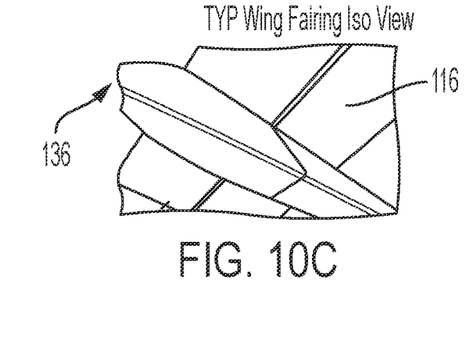
FIG. 10C show a bottom perspective view of a wingtip with external aerodynamic fairing according to examples of the present disclosure.

FIG. 10A and FIG. 10B show top perspective views of a wingtip with external aerodynamic fairing according to examples of the present disclosure. FIG. 10C show a bottom perspective view of a wingtip with external aerodynamic fairing according to examples of the present disclosure. As shown in FIG. 10A, first aerodynamic fairing example 122, second aerodynamic fairing example 124, and third aerodynamic fairing example 126 are shown that vary in shape and size that can be mounted to the underside of wing structure. Also shown is slat 118 that is located near the leading edge of wing structure and aileron 120 that is located near the trailing edge of wing structure. As shown in FIG. 10B, fourth aerodynamic fairing example 128 and fifth aerodynamic fairing example 130 are shown that vary in shape and size that can be mounted to the underside of wing structure. As shown in FIG. 10C, another example aerodynamic fairing 132 is shown mounted to the underside of wing structure.

Figure 11:
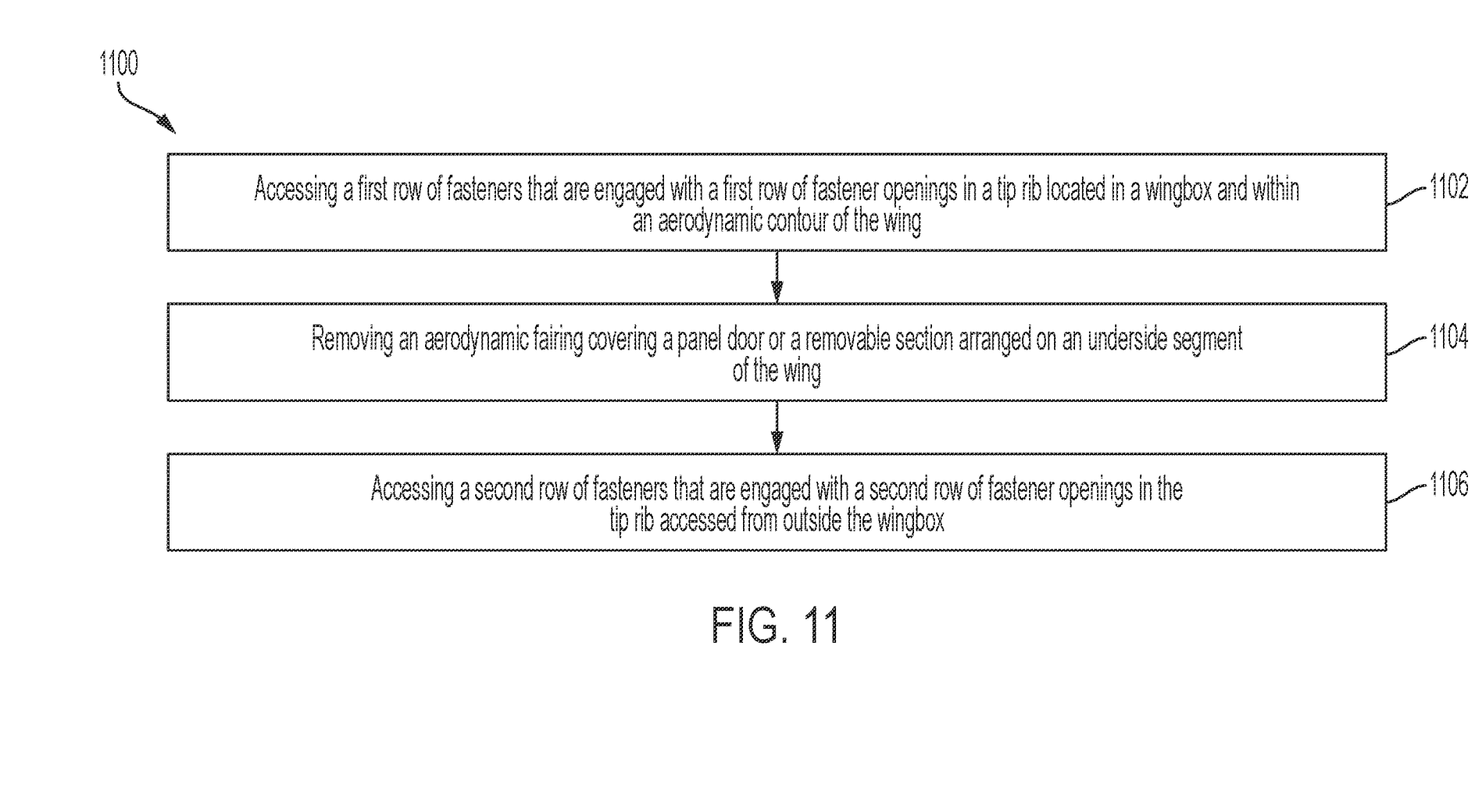
FIG. 11 shows a flowchart for a method of servicing a wingtip of a wing according to examples of the present disclosure.

FIG. 11 shows a flowchart 1100 for a method of servicing a wingtip of a wing according to examples of the present disclosure. The method comprises accessing a first row of fasteners, such as bolts or tension bolts, that are engaged with a first row of tension bolt fastener openings in a tip rib located in a wing box and within an aerodynamic contour of the wing, as in 1102. The method continues by removing an aerodynamic fairing covering a panel door or a removable section arranged on an underside segment of the wing, as in 1104. The method continues by accessing a second row of fasteners, such as bolts or tension bolts, that are engaged with a second row of tension bolt fastener openings in the tip rib accessed from outside the wing box, such as located outside the wing box and outside the aerodynamic contour of the wing, as in 1106. The aerodynamic fairing provides an aerodynamically continuous surface between a leading edge and a trailing edge of the wing.

Figure 12:
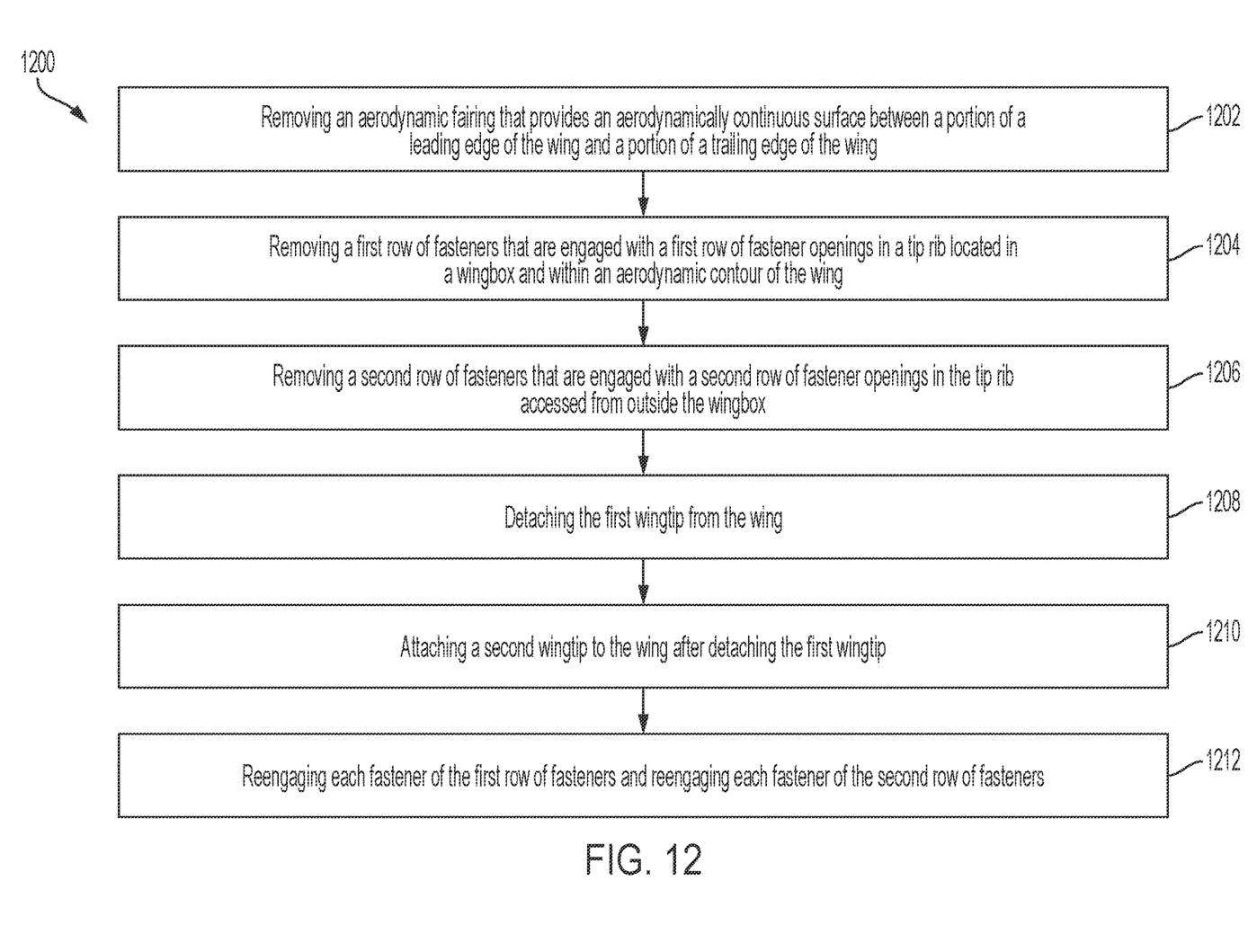
FIG. 12 shows a flowchart for a method of removing a wingtip of a wing according to examples of the present disclosure.

FIG. 12 shows a flowchart 1200 for a method of removing a wingtip of a wing according to examples of the present disclosure. The method comprises removing an aerodynamic fairing that provides an aerodynamically continuous surface between a portion of a leading edge of the wing and a portion of a trailing edge of the wing, as in 1202. The method continues by removing a first row of fasteners, such as bolts or tension bolts, that are engaged with a first row of bolt fastener openings in a tip rib located in a wing box and within an aerodynamic contour of the wing, as in 1204. The method continues by removing a second row of fasteners, such as bolts or tension bolts, that are engaged with a second row of bolt fastener openings in the tip rib accessed from outside the wing box, such as located outside the wing box and outside the aerodynamic contour of the wing, as in 1206. The method continues by detaching the wingtip from the wing, as in 1208. The aerodynamic fairing covers a panel door or a removable section arranged on an underside segment or an upperside segment of the wing. The method further comprising attaching a second wingtip to the wing after detaching the first wingtip, as in 1210. The method further comprising reengaging each fastener of the first row of fasteners and reengaging each fastener of the second row of fasteners, as in 1212.

Examples of the present disclosure can include one or more of the following clauses.

Clause 1 A wingtip attachment for connection to a wing, the wingtip attachment comprising:
  a tip rib comprising;
    a first row of fastener openings located within an aerodynamic contour of a wing box; and
    a second row of fastener openings located outside the aerodynamic contour of a wing box.

Clause 2 The wingtip attachment of clause 1, further comprising:
  a panel door arranged on an underside surface or topside surface of the wing that provides access to the first row of fastener openings.

Clause 3 The wingtip attachment of clause 1 or clause 2, further comprising:
  a removable section of an underside surface or a topside surface of the wing that provides access to the first row of fastener openings; or
  an access provision arranged from a leading edge of the wing (for example a hole in either or both spars) that provides access to the first row of fastener openings.

Clause 4 The wingtip attachment of any of clauses 1-3, further comprising:
  an aerodynamic fairing covering the panel door and configured to provide an aerodynamically continuous surface between a portion of a leading edge and a portion trailing edge of the wing.

Clause 5 The wingtip attachment of any of clauses 1-4, further comprising:
  an aerodynamic fairing covering the removable section and configured to provide an aerodynamically continuous surface between a leading edge and a trailing edge of the wing.

Clause 6 The wingtip attachment of any of clauses 1-5, wherein the second row of fastener openings are accessible outside of the wing box.

Clause 7 The wingtip attachment of any of clauses 1-6, wherein the second row of fastener openings are covered by an aerodynamic fairing that provides an aerodynamically continuous surface between a leading edge and a trailing edge of the wing.

Clause 8 The wingtip attachment of any of clauses 1, further comprising:
  a first row of fasteners for engagement with the first row of fastener openings; and
  a second row of fasteners for engagement with the second row of fastener openings.

Clause 9. The wingtip attachment of any of clauses 1-8, wherein each fastener of the first row of fasteners comprises a tension bolt threadedly engaged with a barrel nut.

Clause 10. The wingtip attachment of any of clauses 1-9, wherein each fastener of the second row of fasteners comprises a tension bolt threadedly engaged with a nut.

Clause 11. A method of servicing a wingtip of a wing, the method comprising:
  accessing a first row of fasteners that are engaged with a first row of tension bolt fastener openings in a tip rib located in a wing box and within an aerodynamic contour of the wing;
  removing an aerodynamic fairing covering a panel door or a removable section arranged on an underside segment of the wing; and
  accessing a second row of fasteners that are engaged with a second row of tension bolt fastener openings in the tip rib accessed from outside the wing box.

Clause 12. The method of clause 11, wherein the aerodynamic fairing provides an aerodynamically continuous surface between a leading edge and a trailing edge of the wing.

Clause 13. The method of clause 11 or clause 12, wherein each fastener of the first row of fasteners comprises a tension bolt threadedly engaged with a barrel nut.

Clause 14. The method of any of clauses 11-13, wherein each fastener of the second row of fasteners comprises a tension bolt threadedly engaged with a nut.

Clause 15. A method of removing a first wingtip of a wing, the method comprising: removing an aerodynamic fairing that provides an aerodynamically continuous surface between a portion of a leading edge of the wing and a portion of a trailing edge of the wing;
- removing a first row of fasteners that are engaged with a first row of bolt fastener openings in a tip rib accessed from outside a wing box;
- removing a second row of fasteners that are engaged with a second row of bolt fastener openings in the tip rib located outside the wing box and outside the aerodynamic contour of the wing; and
- detaching the first wingtip from the wing.

Clause 16. The method of clause 15, wherein the aerodynamic fairing covers a panel door or a removable section arranged on an underside segment or an upperside segment of the wing.

Clause 17. The method of clause 15 or clause 16, wherein each fastener of the first row of fasteners comprises a tension bolt threadedly engaged with a barrel nut.

Clause 18. The method of any of clauses 15-17, wherein each fastener of the second row of fasteners comprises a tension bolt threadedly engaged with a nut.

Clause 19. The method of any of clauses 15-18, further comprising attaching a second wingtip to the wing after detaching the first wingtip.

Clause 20. The method of any of clauses 15-19, further comprising reengaging each fastener of the first row of fasteners and reengaging each fastener of the second row of fasteners.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A wingtip attachment for connection to a wing, the wingtip attachment comprising:
   a tip rib comprising:
      a first row of fastener openings located and accessible within an aerodynamic contour of a wing box and bounded by a top wing skin and a bottom wing skin; and
      a second row of fastener openings located and accessible outside the aerodynamic contour of a wing box and below the bottom wing skin.

2. The wingtip attachment of claim 1, further comprising:
   an access hole arranged on an underside surface or topside surface of the wing that provides access to the first row of fastener openings.

3. The wingtip attachment of claim 2, further comprising:
   an aerodynamic fairing covering the access hole and configured to provide an aerodynamically continuous surface between a portion of a leading edge and a portion trailing edge of the wing.

4. The wingtip attachment of claim 3, wherein the aerodynamic fairing protrudes below a lower surface of the wing box.

5. The wingtip attachment of claim 1, further comprising:
an access hole covered by a removable section of an underside surface or a topside surface of the wing that provides access to the first row of fastener openings.

6. The wingtip attachment of claim 5, further comprising:
an aerodynamic fairing covering the removable section and configured to provide an aerodynamically continuous surface between a leading edge and a trailing edge of the wing.

7. The wingtip attachment of claim 1, wherein the second row of fastener openings are accessible outside of the wing box.

8. The wingtip attachment of claim 1, wherein the second row of fastener openings are covered by an aerodynamic fairing that provides an aerodynamically continuous surface between a leading edge and a trailing edge of the wing.

9. The wingtip attachment of claim 1, further comprising:
a first row of fasteners for engagement with the first row of fastener openings; and
a second row of fasteners for engagement with the second row of fastener openings.

10. The wingtip attachment of claim 9, wherein each fastener of the first row of fasteners comprises a tension bolt threadedly engaged with a barrel nut.

11. The wingtip attachment of claim 9, wherein each fastener of the second row of fasteners comprises a tension bolt threadedly engaged with a nut.

12. The wingtip attachment of claim 1, wherein an aerodynamic fairing covers a panel door arranged on an underside segment or an upperside segment of the wing.

13. The wingtip attachment of claim 1, wherein an aerodynamic fairing covers a removable section arranged on an underside segment or an upperside segment of the wing.

14. The wingtip attachment of claim 1, wherein the first row of fastener openings are arranged above the second row of fastener openings.

15. The wingtip attachment of claim 1, wherein the wingtip attachment is removeable from the wing.

16. The wingtip attachment of claim 1, wherein the tip rib forms a junction between the wing and a wingtip.

17. The wingtip attachment of claim 1, wherein the tip rib is bound by a rear spar at a first end of the tip rib and bound by a forward spar at a second end of the tip rib.

18. The wingtip attachment of claim 1, wherein the tip rib is secured by a U-shaped rear spar at a first end and a U-shaped forward spar at a second end.

19. The wingtip attachment of claim 1, wherein the tip rib is shaped in profile with two parallel portions that are joined by an orthogonal central portion.

20. The wingtip attachment of claim 19, wherein one of the two parallel portions comprises a cross portion that extends below the wing box.

\* \* \* \* \*